(12) United States Patent
Kerres et al.

(10) Patent No.: US 7,674,505 B2
(45) Date of Patent: *Mar. 9, 2010

(54) COMPOSITES AND COMPOSITE MEMBRANES

(75) Inventors: Jochen Kerres, Ostfildern (DE); Thomas Häring, Stuttgart (DE); Rima Häring, Stuttgart (DE)

(73) Assignee: Thomas Haring and Rima Haring, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,870

(22) Filed: Feb. 6, 2006

(65) Prior Publication Data
US 2006/0172084 A1    Aug. 3, 2006

Related U.S. Application Data

(63) Continuation of application No. 09/984,564, filed on Oct. 30, 2001, now Pat. No. 7,049,020, and a continuation of application No. PCT/EP00/03910, filed on May 2, 2000.

(30) Foreign Application Priority Data
Apr. 30, 1999   (DE)   .................. 199 19 881

(51) Int. Cl.
  B05D 3/00   (2006.01)
  H01B 1/14   (2006.01)
  B32B 3/26   (2006.01)
(52) U.S. Cl. .................... 427/557; 252/500; 428/304.4; 428/312.6
(58) Field of Classification Search ................. 204/296, 204/520, 522, 537, 539, 630, 631, 633; 429/33, 429/314, 317; 428/304.4, 312.6; 252/500
See application file for complete search history.

(56) References Cited

U.S. PATENT DOCUMENTS 7,049,020 B2 *   5/2006   Kerres et al. .................. 429/33

* cited by examiner

*Primary Examiner*—D. Lawrence Tarazano
*Assistant Examiner*—Camie S Thompson
(74) *Attorney, Agent, or Firm*—Haynes and Boone, LLP

(57) ABSTRACT

The invention relates to a composite or a composite membrane consisting of an ionomer and of an inorganic optionally functionalized phyllosilicate. The isomer can be: (a) a cation exchange polymer; (b) an anion exchange polymer; (c) a polymer containing both anion exchanger groupings as well as cation exchanger groupings on the polymer chain; or (d) a blend consisting of (a) and (b), whereby the mixture ratio can range from 100% (a) to 100% (b). The blend can be ionically and even covalently cross-linked. The inorganic constituents can be selected from the group consisting of phyllosilicates or tectosilicates.

2 Claims, 1 Drawing Sheet silicate layer
in-between lying cation 7 Na⁺ cation-exchange $[Al_{13}O_4(OH)_{24}(H_2O)_{12}]^{7+}$ calcination pillar $7 H^+ + 6{,}5\ Al_2O_3 + 8{,}5\ H_2O$

COMPOSITES AND COMPOSITE MEMBRANES

CROSS REFERENCE TO RELATED APPLICATIONS

This application is a continuation of, and claims benefit of, U.S. patent application Ser. No. 09/984,564 filed Oct. 30, 2001, now U.S. Pat. No. 7,049,020 and a continuation of the U.S. National Phase of International Application No. PCT/EP00/03910, filed May 2, 2000, now published as WO 00/74827, which claims priority to German Patent Application No. DE 199 19 881.0, filed Apr. 30, 1999, the entire disclosure of each is hereby incorporated herein by express reference hereto.

FIELD OF THE INVENTION

The present invention involves providing composites which possess a high ion conductivity (especially proton conductivity) and simultaneously limited swelling ability and permit an operating temperature in electrochemical cells of above 100° C. The invention relates thus to an ion conducting composite containing an acid and/or an organic base and a phyllosilicate, wherein the composition of the acid-base part is present in an amount from 1 to 99 weight % and the phyllosilicate is present in an amount from 99 to 1 weight %.

BACKGROUND OF THE INVENTION

Ionomer membranes are used in many processes, for example, in membrane fuel cells, in electrodialysis, in diffusion dialysis, in electrolysis (PEM electrolysis, chlorine alkali electrolysis), or in electrochemical processes.

A disadvantage of the actual membranes is, however, that their proton conductivity at temperatures above 100° C. in most cases decreases rapidly due to drying up of membranes. Temperatures above 100° C. are, however, very interesting for fuel cell applications of ionomer membranes, because above 100° C. the temperature regulation of fuel cells is greatly simplified and the catalysis of the fuel cell reaction is substantially improved (excess voltage decreased, no CO-loading any more, which poisons the catalyst).

Only a few examples of membranes which still exhibit good proton conductivity even above 100° C. are known from the literature, for example poly(phenylene)s having carbonyl-1,4-phenylene-oxyphenyl-4-sulfonic acid side groups. However the proton conductivity of these membranes decreases rapidly above 130° C., and the reason for the good proton conductivity between 100° C. and 130° C. is also not clear.

Proton conductivity is based on the Grotthus mechanism with protons in acidic media and hydroxyl ions in alkaline media acting as charge carriers. There exists a structure crosslinked via hydrogen bonds enabling the actual charge transport. That means the water contained in the membrane plays an important part in the charge transport: without this additional water, there is no mentionable charge transport across the membrane in these commercially available membranes; they lose their function. Other new developments, which use phosphate backbones instead of a fluorohydrocarbon backbone, also need water as an additional network builder. (Alberti et al., SSPC9, Bled, Slowenia, 17.-21.8.1998, Extended Abstracts, p. 235). While the addition of small $SiO_2$ particles to the above mentioned membranes (Antonucci et al., SSPC9, Bled, Slowenia, 17.-21.8.1998, Extended Abstracts, p. 187) leads to a stabilization of proton conductivity up to 140° C., this only applies under operating conditions of a pressure of 4,5 bar. Without increased operating pressure, these membranes also lose their water network above 100° C. and dry up. A substantial disadvantage of all the above mentioned membrane types is therefore that, even under best operating conditions, they are usable at application temperatures of up to 100° C.

In the same manner as mentioned above, Denton et al. (U.S. Pat. No. 6,042,958) prepared composites from ion conducting polymers and porous substrates. As silica containing components, they used glass, ceramics, or silica. In the examples described therein, the operating temperature was not increased above 80° C.

While in the direct methanol fuel cell (DMFC) sufficient water is present, methanol crossover through the membrane, however, results in a substantial decrease of power.

If composites of sulfonated polyaryletheretherketone membranes (European Patent No. EP 0574791 B1) or sulfonated polyethersulfone and silica are prepared, the membrane swells at an cation-exchange capacity of 1.5 meq/g to an extent that it is ultimately destroyed.

Phyllosilicates (clay minerals) have some interesting properties:

They can bind hydrate water up to 250° C.

In these materials, metal cations and metal oxides can be additionally incorporated, inducing hereby an intrinsic proton conductivity according to the general scheme:

$$M^{n+}(H_2O) \rightarrow (M-OH)^{(n-1)+} + H^+$$

[Zeolite, Clay and Heteropoly Acid in Organic Reactions, Y. Izumi, K. Urabe, M. Onaka; 1992; Weinheim, VCH-Verlag, p. 26].

Phyllosilicates having Lewis acid cavities may intercalate by acid-base interaction with the basic groups of basic polymers [Kunststoffnanokomposite, symposium: Von der Invention zur Innovation, Publication at the Symposium of the Fonds of the Chemical Industry, 6$^{th}$ of May, 1998, in Cologne].

Due to these properties, some types of phyllosilicate/polymer composites have been synthesized. Mühlhaupt et al. made composites from montmorillonite and polypropylene, montmorillonite and polyamide, and montmorillonite and PERSPEX™. In these composites, for example, the PERSPEX becomes hardly flammable, due to the admixture with montmorillonite, because the incorporated phyllosilicates are barriers to the pyrolysis gases formed on combustion.

SUMMARY OF THE INVENTION

Figure 1:
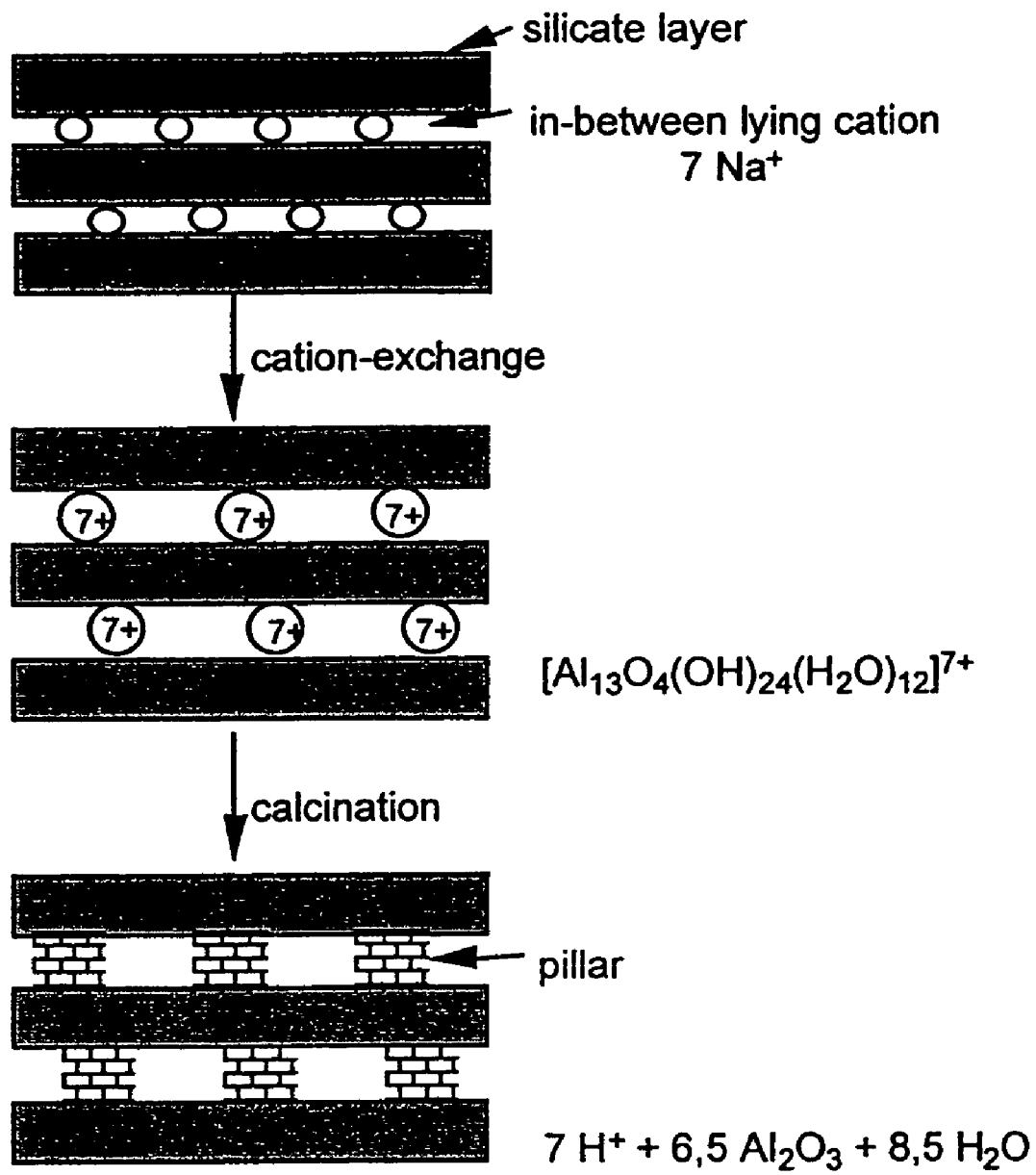
FIG. 1 is a depiction of three (3) embodiments of the invention.

The advantage of the composites according to the invention, and the membranes prepared therewith, is the incorporation of an organic component, especially of protonated nitrogen bases, into the cavities of the phyllosilicates, which is a cross-linking component, when the base is provided on a polymer backbone. Furthermore, the selective incorporation of cations or metal hydroxides with subsequent reaction to the corresponding metal oxides permits varying the Lewis acid properties and size of the membrane cavities in a wide range. Moreover, the phyllosilicates can be functionalized to interact with ionomers in which they are embedded or to influence the surrounding medium according to their functional group.

The invention relates to an ion conducting composite comprising: (A) a polymer; (B) an acid-base component comprising an acid and/or a base; and (C) a phyllosilicate and/or tectosilicate, wherein components (A) and (B) can be combined into a polymer comprising an acidic and/or basic group. The sum of the amounts of the acid-base component and the polymer are from 1 to 99 weight % and the amount of phyllosilicate and/or tectosilicate is from 99 to 1 weight %. The acid and/or a base is present in the cavities of the phyllosilicate and/or tectosilicate.

In one embodiment, an ionomer is used as the combination of components A) and (B) and is selected from the group consisting of:

a) a cation exchange polymer comprising a cation exchange group —SO₃H, —COOH, and/or —PO₃H₂, wherein the polymer can be non-cross-linked or covalently crosslinked and the polymer backbone can be a vinyl polymer, an aryl main chain polymer, polythiazole, polypyrazole, polypyrrole, polyaniline, polythiophene or any blend of these;

b) an anion exchange polymer comprising an anion exchange group —NR₃⁺, PyrH⁺, ImR⁺, PyrazR⁺, TriR⁺, and/or other organic basic aromatic and/or non-aromatic groups, wherein R is a hydrogen, alkyl, or aryl group, wherein the polymer is non-cross-linked or covalently crosslinked, and wherein the polymer comprises a vinyl polymer, an aryl main chain polymer, polythiazole, polypyrazole, polypyrrole, polyaniline, polythiophene, or a blend thereof;

c) a polymer containing on the polymer chain both anion exchange groups from (b) and cation exchange groups from (a), wherein the polymer comprises a vinyl polymer, an aryl main chain polymer, polythiazole, polypyrazole, polypyrrole, polyaniline, polythiophene, or a blend thereof; or d) a blend of (a) and (b), wherein the mixing ratio can range from 100% of (a) to 100% of (b), wherein the blend is covalently and ionically cross-linked, and wherein the polymer comprises a vinyl polymer, an aryl main chain polymer, polythiazole, polypyrazole, polypyrrole, polyaniline, polythiophene, or a blend thereof.

Preferably, the ionomer is an ionomer blend (d), and the phyllosilicate is montmorillonite or clinoptilolite.

In another embodiment, a precursor of the ionomer is used as the combination of components (A) and (B) and is selected from the group consisting of:

(a) the precursor of: a cation exchange polymer (a1) comprising COHal, CONR₂, or COOR groups; a cation exchange polymer (a2) comprising SO₂Hal, SO₂NR₂, or SO₂OR groups; or a cation exchange polymer (a3) comprising PO₃Hal₂, PO₃(NR₂)₂, or PO₃(OR)₂ groups, wherein R is a hydrogen, alkyl, or aryl group, and wherein Hal is a fluorine, chlorine, bromine, or iodine atom; or (b) the precursor of an anion exchange polymer comprising —NR₂, pyridyl, imidazolyl, pyrazolyl, triazolyl, and/or other organic basic aromatic and/or non-aromatic groups, wherein R is a hydrogen, alkyl, or aryl group, and wherein Hal is a fluorine, chlorine, bromine, or iodine atom.

Advantageously, the phyllosilicate is a bentonite. More preferably, the bentonite is montmorillonite. Alternatively, the phyllosilicate may be a pillared phyllosilicate, and/or the tectosilicate may be a zeolite, such as clinoptilolite.

In one embodiment, the basic component contains imidazole, vinylimidazole, pyrrazole, oxazole, carbazole, indole, isoindole, dihydrooxazole, isooxazole, thiazole, benzothiazole, isothiazole, benzoimidazole, imidazolidine, indazole, 4,5-dihydropyrazole, 1,2,3-oxadiazole, furazane, 1,2,3-thiadiazole, 1,2,4-thiadiazole, 1,2,3-benzotriazole, 1,2,4-triazole, tetrazole, pyrrole, aniline, pyrrolidine, or pyrrazole groups.

In one embodiment, the polymer component (A) comprises an acid polymer, and wherein the backbone of the polymer comprises one or more of the following repeat units:

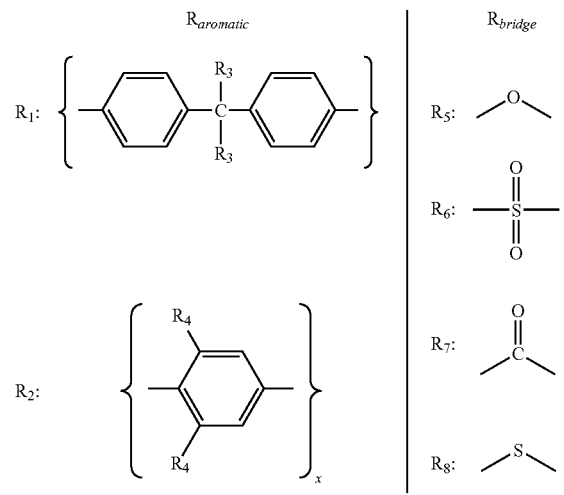

If the polymer component (A) is a basic polymer, the backbone of the polymer may comprise one or more of the repeat units above or one or more of the following repeat units:

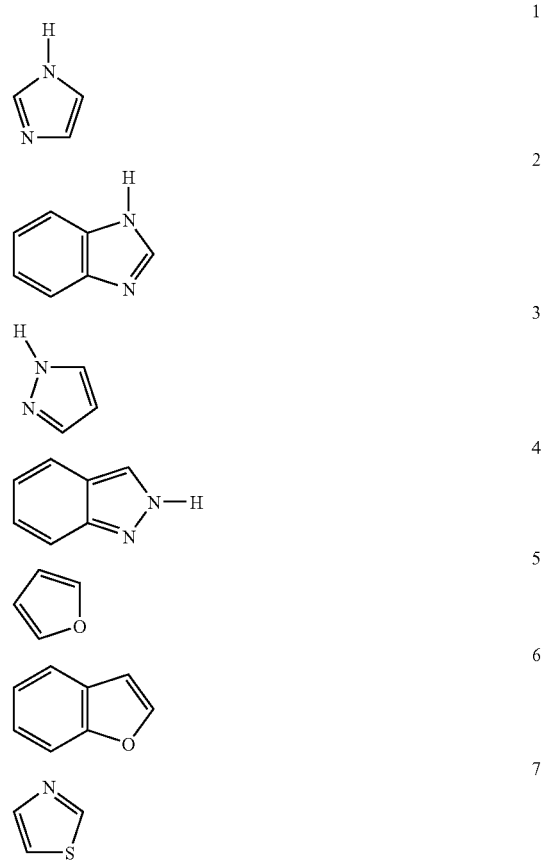

-continued

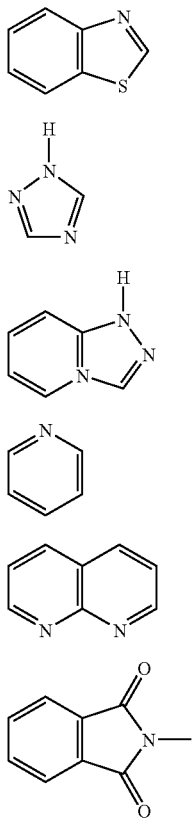

Components (A) and (B) may be combined into 1) a polymer comprising an acidic group and 2) a polymer comprising a basic group.

The composite is useful as a component in a fuel cell which operates at temperatures from −40° C. to 200° C., or a reverse osmosis or (electro)membrane separator which separates two or more gases or liquids with a membrane comprising the composite. The composite is also useful as a component in a catalytic membrane or a membrane reactor. Advantageously, the composite exhibits thermal resistance up to 400° C.

The invention also contemplates a process for the preparation of the composite, wherein the polymer component, the acid-base component, and the phyllosilicate and/or tectosilicate component are brought into contact, optionally with a solvent, at a temperature from −40° C. to 300° C.

DETAILED DESCRIPTION OF THE PREFERRED EMBODIMENTS (a) The acid may be a cation exchange polymer (having cation exchange groups —$SO_3H$, —COOH, —$PO_3H_2$, wherein the polymer can be modified with only one of the described cation exchange groups or with a blend of the described cation exchange groups); wherein the polymer can be not cross-linked or covalently cross-linked. The ion exchange capacity in general is comprised between 0.1 and 12 meq/g, more preferably between 0.3 and 8 meq/g, most preferably between 0.5 and 2 meq/g. Particularly preferred as backbone are thermoplastics.

(b) The acid can also be an organic or inorganic low molecular weight acid. In the inorganic acid case, sulfuric and phosphoric acid are particularly preferred. In the organic acid case, all low molecular weight acids that are sulfonic or carboxylic acids are taken into consideration, especially all amino sulfonic acids and the aminosulfochlorides as their precursors.

(c) The base may be an anion-exchange polymer (having anion exchange groups —$NR_3^+$(R=H, alkyl, aryl), pyridinium (PyrR$^+$), imidazolium ImR$^+$), pyrazolium (PyrazR$^+$), triazolium (TriR$^+$), and other organic basic aromatic and/or non-aromatic groups (R=H, alkyl, aryl), wherein the polymer can be modified with only one of the described anion exchange groups or with a blend of the described anion exchange groups); and wherein the polymer can be non-cross-linked or covalently cross-linked. The anion exchange capacity herein is preferably between 1 and 15 meq/g, more preferably between 3 and 12 meq/g, most preferably between 6 and 10 meq/g. Preferred as backbone are again all thermoplastics, particularly polysulfone, polyetheretherketone, polybenzimidazole, and polyvinylpyridine.

(d) The base can be an organic or inorganic low molecular weight base. As an organic low molecular weight base, all guanidine derivatives are particularly preferred.

(e) The functional group of the acid and the base may be in the same molecule. This molecule can be low or high molecular weight. If it is a polymer, then on the polymer chain there are anion exchange groups from (c) as well as cation exchange groups from (a).

(f) The above-mentioned acids and bases of (a) to (e) may be blended in the composite. Any mixing ratio can be chosen. The blend can be further covalently cross-linked, in addition to the ionic cross-linking.

(g) If both the acid and the base are low molecular weight, there is in addition an unmodified polymer contained in the composite.

(h) The inorganic active filler is a phyllosilicate based on montmorillonite, smectite, illite, sepiolite, palygorskite, muscovite, allevardite, amesite, hectorite, talc, fluorhectorite, saponite, beidelite, nontronite, stevensite, bentonite, mica, vermiculite, fluorvermiculite, halloysite, fluor containing synthetical talc types, or blends of two or more of the above-mentioned phyllosilicates. The phyllosilicate can be delaminated or pillared. Particularly preferred is montmorillonite.

The weight ratio of the phyllosilicate is preferably from 1 to 80%, more preferably from 2 to 30% by weight, most preferably from 5 to 20%.

The term "a phyllosilicate" in general means a silicate, in which the $SiO_4$ tetraeders are connected in two-dimensional infinite networks. (The empirical formula for the anion is $(Si_2O_5^{2-})_n$). The single layers are linked to one another by the cations positioned between them, which are usually Na, K, Mg, Al, or/and Ca, in the naturally occurring phyllosilicates.

By the term "a delaminated functionalized phyllosilicate," we understand phyllosilicates in which the layer distances are at first increased by reaction with so-called functionalisation agents. The layer thickness of such silicates before delamination is preferably 5 to 100 angstroms, more preferably 5 to 50, and most preferably 8 to 20 angstroms. To increase the layer distances (hydrophobization), the phyllosilicates are reacted (before production of the composites according to the invention) with so-called functionalizing hydrophobization agents, which are often also called onium ions or onium salts.

The cations of the phyllosilicates are replaced by organic functionalizing hydrophobization agents, whereby the desired layer distances which depend on the kind of the respective functionalizing molecule or polymer which is to be incorporated into the phyllosilicate can be adjusted by the kind of the organic residue.

The exchange of the metal ions can be complete or partial. Preferred is the complete exchange of metal ions. The quantity of exchangeable metal ions is usually expressed as milli equivalent (meq) per 1 g of phyllosilicate and is referred to as ion exchange capacity. Preferred are phyllosilicates having a cation exchange capacity of at least 0.5, preferably 0.8 to 1.3 meg/g.

Suitable organic functionalizing hydrophobization agents are derived from oxonium, ammonium, phosphonium, and sulfonium ions, which may carry one or more organic residues.

As suitable functionalizing hydrophobization agents, those of general formula I and/or II are mentioned:

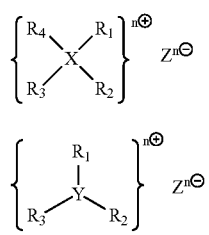

where the substituents have the following meaning:

$R_1$, $R_2$, $R_3$, and $R_4$ are independently from each other: hydrogen, a straight chain, branched, saturated or unsaturated hydrocarbon radical with 1 to 40, preferably 1 to 20, C atoms, optionally carrying at least one functional group, or 2 of the radicals are linked with each other, preferably to a heterocyclic residue having 5 to 10 C atoms, more preferably having one or more N atoms, X represents phosphorous or nitrogen, Y represents oxygen or sulfur, n is an integer from 1 to 5, preferably 1 to 3, and Z is an anion.

Suitable functional groups are hydroxyl, nitro, or sulfo groups, whereas carboxyl or sulfonic acid groups are especially preferred. In the same way, sulfochloride and carboxylic acid chloride groups are especially preferred.

Suitable anions, Z, are derived from proton delivering acids, in particular mineral acids, wherein halogens, such as chlorine, bromine, fluorine, iodine, sulfate, sulfonate, phosphate, phosphonate, phosphite, and carboxylate, especially acetate, are preferred. The phyllosilicates used as starting materials are generally reacted as a suspension. The preferred suspending agent is water, optionally mixed with alcohols, especially lower alcohols having 1 to 3 carbon atoms. If the functionalizing hydrophobization agent is not water-soluble, then a solvent is preferred in which said agent is soluble. In such cases, this is especially an aprotic solvent. Further examples for suspending agents are ketones and hydrocarbons. Usually, a suspending agent miscible with water is preferred. On addition of the hydrophobizing agent to the phyllosilicate, ion exchange occurs, whereby the phyllosilicate usually precipitates from the solution. The metal salt resulting as a by-product of the ion exchange is preferably water-soluble, so that the hydrophobized phyllosilicate can be separated as a crystalline solid, for example, by filtration.

The ion exchange is mostly independent from the reaction temperature. The temperature is preferably above the crystallization point of the medium and below the boiling point thereof. For aqueous systems, the temperature is between 0 and 100° C., preferably between 40 and 80° C.

For a cation and anion exchange polymer, alkylammonium ions are preferred, in particular if, as a functional group, additionally a carboxylic acid chloride or sulfonic acid chloride is present in the same molecule. The alkylammonium ions can be obtained via usual methylation reagents, such as methyl iodide. Suitable ammonium ions are omega-aminocarboxylic acids; especially preferred are omega-aminosulfonic acids and omegaalkylaminosulfonic acids. Omega-aminosulfonic acids and omega-alkylaminosulfonic acids can be obtained with usual mineral acids, for example, hydrochloric acid, sulfuric acid, or phosphoric acid, or by methylation reagents, such as methyl iodide.

Additional preferred ammonium ions are pyridine and laurylammonium ions. After hydrophobizing, the layer distance of the phyllosilicates is in general between 10 and 50 angstroms, preferably between 13 and 40 angstroms.

The hydrophobized and functionalized phyllosilicate is freed of water by drying. In general, a thus treated phyllosilicate still contains a residual water content of 0-5 weight % of water. Subsequently, the hydrophobized phyllosilicate can be mixed in form of a suspension in a suspending agent, which is free as much as possible from water with the mentioned polymers and can be further processed. According to the invention, the polymers, especially preferably the thermoplastic functionalized polymers (ionomers), are added to the suspension of the hydrophobized phyllosilicates. This can be done using already dissolved polymers, or the polymers are dissolved in the suspension itself. Preferably, the ratio of the phyllosilicates is between 1 and 70 weight %, more preferably between 2 and 40 weight %, and most preferably between 5 and 15 weight %.

Process for Producing the Composite

The present invention concerns, furthermore, a process for producing composite membranes. In the following, process examples to produce proton conducting composites having high proton conductivity are described.

1) An aminoarylsulfochloride is dissolved in tetrahydrofuran. Then, a corresponding quantity of montmorillonite K10 is added. The montmorillonite is proton exchanged and dried. Then, stirring for several hours follows. The time of stirring depends on the molecular size of the aminoarylsulfochloride and the ratio of the amino group to the cation exchange capacity of the montmorillonite. During the stirring process, the amino group intercalates into the cavities of the montmorillonite. To the suspension, sulfochlorinated polysulfone dissolved in tetrahydrofuran is then added. The sulfochloride content of the thermoplastic is approximately 0.5 groups per repeating unit. The suspension is stirred, gently degassed and knife-coated into a film on a glass plate. The tetrahydrofuran is evaporated at room temperature. The content of montmorillonite is chosen to be between 5 and 10 weight % of the added sulfochlorinated polysulfone. Once the film is totally dried, the film is peeled off in deionised water and cured in 10% hydrochloric acid at 90° C. Hereby, the sulfochloride groups are hydrolyzed and reacted to sulfonic acid groups. The resulting membrane is additionally cured in water of 80-90° C., until hydrochloric acid is no longer detectable.

A sulfochlorinated polysulfone having 0.5 $SO_2Cl$ groups per repeating unit corresponds, after hydrolysis, to a cation exchange capacity of 1.0 milliequivalent per gram. Due to the additional sulfonic acid groups from the aminoarylsulfochloride, the cation exchange capacity increases remarkably, corresponding to the quantity thereof, and is not water-soluble. At the same cation exchange capacity, exclusively sulfonated polysulfone is water-soluble.

2) Sulfonated polyetheretherketone, having a cation exchange capacity (IEC) of 0.9 milliequivalent per gram, is dissolved in hot (T>80° C.) N-methylpyrrolidone (NMP). The sulfochlorinated form having such a content is not soluble in THF. Polymeric sulfonic acids and their salts are not, or only to a very small extent, soluble in THF. To this solution, a suspension of montmorillonite K10, loaded with an aminosulfonic acid, in NMP is then added. Herein, the sulfonic acid groups are present on the surface, whereas the amino groups are in the cavities of the montmorillonite. The composition of the suspension is again chosen for a solid content to be between 2 and 20 weight of the polymer content. It depends on the application for which the membrane is used. The suspension is processed to a membrane, as above. The solvent is evaporated in a drying board at a temperature between 80° C. and 150° C. The membrane is peeled off from the glass plate and cured in deionized water for 12 hours at 90° C.

3) Sulfochlorinated polysulfone and aminated polysulfone are dissolved in THF. Then, 10 weight % of montmorillonite K10 (dried and in protonated form) is added. The suspension is stirred, degassed and processed to a membrane, as above. The membrane is peeled off from the glass plate and then cured in diluted HCl at 80° C., whereby the sulfochloride group is rehydrolyzed to the sulfonic acid. Then, the membrane is again further treated with deionized water, until all the hydrochloric acid is removed from the membrane.

It has now been found that the composites relating to the invention have surprising properties:

The composites have excellent ionic conductivities even at temperatures far beyond 100° C. Especially, the proton conductivities of the composites are still excellent in this temperature range, due to, on one hand, the water storing properties of the clay materials and, on the other hand, the self-proton conducting properties of the clay materials. The good proton conductivities permit the use of these composites in membrane fuel cells in the above mentioned temperature range.

Due to the silicates forming cavities, the chemical, mechanical, and thermal stability of composite membranes is significantly increased, because the polymer molecules and the clay minerals and zeolites, respectively, can interact with each other in the cavities. Especially, ionomer blends containing basic polymers and base polymer components may intercalate into the Lewis acid cavities of the silicates, due to the interaction of the base groups, whereby an ionic cross-linking between the acidic silicate and the basic polymer chain is formed, which, depending on the system, may be pH independent, contributing to an increase in mechanical, chemical, and thermal stability, in particular if the composite membranes are used in a strongly acidic or alkaline medium.

Used in DMFC, the composite membranes relating to the invention show a reduced methanol permeability and gas-through-diffusion across the membrane. Therein, the methanol permeability and the permselectivity of the membrane can be fine tuned at will by:

The kind of phyllosilicate/tectosilicate

The mass percentage of the silicate in the composite

Targeted incorporation of spacer molecules and bifunctional molecules into the silicate cavities. The kind and strength of the interaction of the spacer molecules with the permeate molecules hereby depends on the kind of their functional groups facing outwards and the kind of the functional groups of the permeate molecules. For example, an aminosulfonic acid or an amino carboxylic acid is coupled with the amine functionality in exchange of alkali-bentonite on the bentonite surface. The second functional group is available for the reaction with polymers or for proton transport in electromembrane processes.

The membranes according to the invention show a strongly decreased fouling (microbial attack of the ionomer membranes by fungi and bacteria), in comparison to conventional ionomer membranes, and this already at a content of 2-5% of silicate (montmorillonite) in the ionomer membrane. This property is due to the clay minerals blended with the composite. It has been known for long that clay minerals may act as soil improving agent by strongly slowing down the microbial degradation, especially by fungi. It is surprising that this property of clay minerals is also shown in membranes which contain clay minerals. Due to this property of the composites according to the invention, their use in membrane separation processes in water and waste water applications is possible and also in any other oxidizing environment, containing, e.g., hydroxy radicals and/or hydrogen peroxide.

The catalytic properties of the silicate Lewis acids, from which the clay minerals according to the invention are made, can also be used in the composites according to the invention.

EXAMPLES

1. Sulfonated polyetheretherketone (sulfonation degree 70%) is dissolved with 5 weight % of montmorillonite in DMAc and knife-coated to a membrane of 50 μm thickness after evaporation of the solvent. This membrane is put into an aqueous medium contaminated with fungi. No attack by fungi is identified. The blank without montmorillonite is heavily colonized and attacked.

2. a) Sulfonated polysulfone in salt form and polyvinylpyridine is blended in such a ratio that the final capacity is 1 milli equivalent [H$^+$] per gram of the total blend. Both polymers are dissolved in DMAc and processed to a membrane. The specific resistance of this membrane is 33 ohm·cm.

b) To an identical blend as in 2a, additionally 8 weight % of activated montmorillonite is added, and the blend obtained is processed to a membrane as in 2a. The specific resistance is 27.7 ohm·cm.

3. Polybenzimidazole dissolved in DMAc is mixed with 10 weight % of activated montmorillonite and as a blank without the phyllosilicate. Either blend is processed to a membrane, and the resistances are measured by impedance spectroscopy. Without the phyllosilicate, the resistance is 588 ohm·cm, with the phyllosilicate, 276 ohm·cm.

We claim:

1. A process for preparing a composite comprising:
Preparing components (A) to (D):
(A) a polymer;
(B) an acid; and
(C) an organic base; and
(D) a functionalized phyllosilicate or tectosilicate wherein, based on the sum of the amounts of acid, the base, and the phyllosilicate or tectosilicate, the composition of the acid-base part is 1 to 99 weight % and of the phyllosilicate or tectosilicate part is 99 to 1 weight %;
Wherein the polymer is selected from the group consisting of:
(E) an unmodified polymer with low molecular weight acid and base; and (F) an ionomer or a precursor of an ionomer, wherein the ionomer is selected from the group consisting of:
  (a) a cation exchange polymer having a cation exchange group —$SO_3H$, —COOH and/or —$PO_3H_2$, wherein the polymer is non-cross-linked or covalently crosslinked and having a polymer backbone selected from a group consisting of: a vinyl polymer, an aryl main chain polymer, polythiazole, polypyrazole, polypyrrole, polyaniline, polythiophene or any blend thereof; and
  (b) an anion exchange polymer having an anion exchange group —$NR_3^+$ (R=H, alkyl, aryl), pyridinium ($PyrR^+$), imidazolium ($ImR^+$), pyrazolium ($PyrazR^+$), triazolium ($TriR^+$), wherein the polymer is non-cross-linked or covalently cross-linked, and having a polymer backbone selected from the group consisting of a vinyl polymer, an aryl main chain polymer, polythiazole, polypyrazole, polypyrrole, polyaniline, polythiophene and any blend thereof;
  (c) a polymer containing on the polymer chain both an anion exchange group selected from (b) and an cation exchange group selected from (a), wherein the polymer is selected from the group consisting of: a vinyl polymer, an aryl main chain polymer, polythiazole, polypyrazole, polypyrrole, polyaniline, polythiophene and any blend thereof; and
  (d) a blend of one or more cation exchange polymers of (a) and one or more anion exchange polymers of (b), wherein the blend is covalently cross-linked, in addition to an ionic cross-linking, having a polymer backbone selected from the group consisting of: a vinyl polymer, an aryl main chain polymer, polythiazole, polypyrazole, polypyrrole, polyaniline, polythiophene and any blend thereof; and wherein the precursor of an ionomer is selected from the group consisting of:
  (I) a precursor of a cation exchange polymer, selected from the group consisting of:
    (Ia) a polymer with COHal-groups, $CONR_2$-groups or COOR-groups;
    (Ib) a polymer with $SO_2Hal$-groups, $SO_2NR_2$-groups or $SO_2OR$-groups; and
    (Ic) a polymer with $PO_3Hal_2$-groups, $PO_3(NR_2)_2$-groups or $PO_3(OR)_2$-groups;
    where R is hydrogen, an alkyl, or an aryl group, and wherein Hal is fluorine, chlorine, bromine, or iodine atom; and
  (II) a precursor of an anion exchange polymer comprising —$NR_2$, pyridyl, imidazolyl, pyrazolyl, triazolyl groups; and bringing components (A), (B), (C) and (D) into contact at the temperature range of −40° C. to 300° C.

2. A process according to claim 1, wherein during the preparation of the phyllosilicate or tectosilicate component, the phyllosilicate or tectosilicate is mixed with at least two different basic components.

* * * * *